Aug. 25, 1964     R. GROSFILLEX     3,146,028
COLLAPSIBLE SEAT
Original Filed Nov. 25, 1959
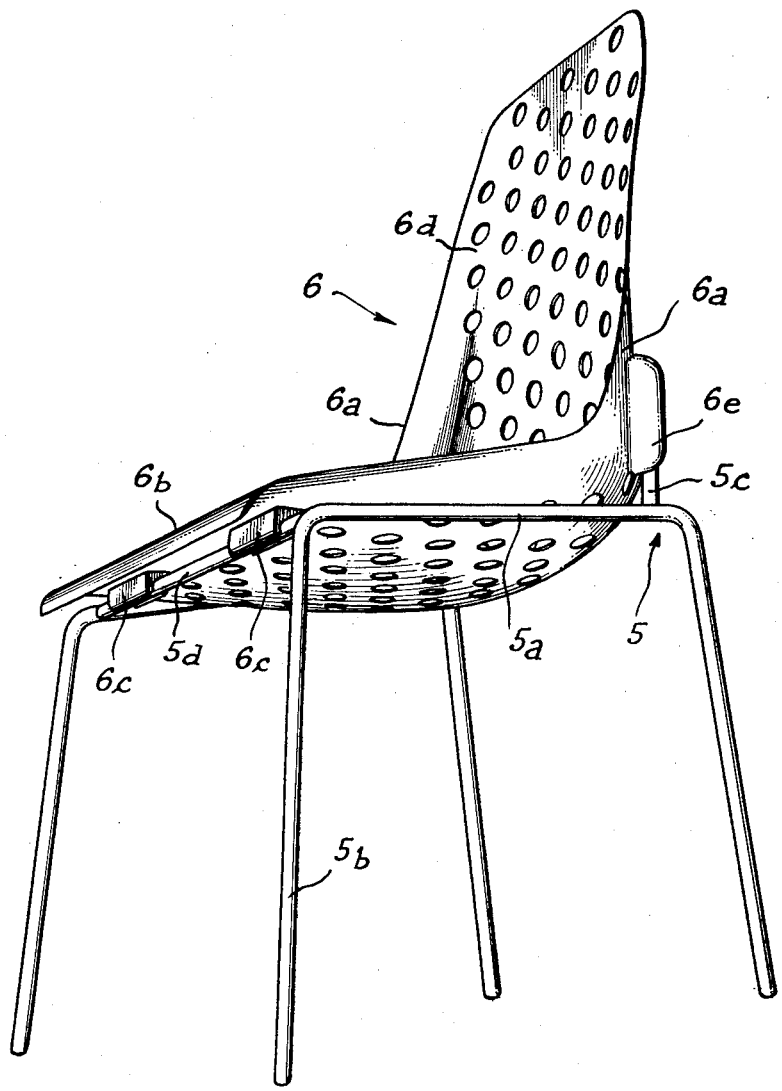

United States Patent Office 3,146,028
Patented Aug. 25, 1964

3,146,028
COLLAPSIBLE SEAT
Raymond Grosfillex, Arbent, Ain, France, assignor to Société à responsabilité limitée dite Grosfillex Freres, Arbent, Ain, France
Original application Nov. 25, 1959, Ser. No. 855,363, now Patent No. 3,061,374. Divided and this application Aug. 31, 1962, Ser. No. 220,716
Claims priority, application, France, Nov. 25, 1958, 779,970, Patent 1,216,435; Apr. 4, 1959, 791,251, Patent 1,216,435; Oct. 2, 1959, 806,660
2 Claims. (Cl. 297—440)

The invention relates to the construction of seats, such as chairs, armchairs and the like, of the type comprising a usually metallic tubular frame structure, and a seating section removably connected therewith. This application is a division of application Serial No. 855,363, filed November 25, 1959, now Patent No. 3,061,374.

It is an object of this invention to provide seats of the above character adapted to be very easily and quickly disassembled and reassembled without requiring the use of any separate connecting means, and which are sturdy, comfortable, lightweight and attractive.

According to an aspect of the invention, there is provided a seat comprising a rigid frame made of frame members of generally round section, and comprising supporting legs, a generally horizontal seat frame section on said legs including a front cross member and a pair of relatively short uprights upstanding from said seat section near the rear side corners thereof, a unitary molded element of resilient molded plastic including a seating portion and a back portion, engaging means integrally molded with the periphery of said element and defining longitudinally slotted tubular means of substantial resiliency including first engaging means adapted for clamping engagement with said front cross member and second engaging means adapted for engagement with the respective uprights where upon said back portion of the element projects upwardly substantially beyond the top of said uprights, and said seat portion of the element is supported in a position to be sat on by a user.

According to another aspect of the invention, there is provided in a seat as defined above, a pair of upstanding wing-like flanges formed at the sides of said seating portion of the element, and said second engaging means are formed at the rear of said respective flanges for engagement wtih said respective uprights.

An illustrative embodiment of the invention will now be described with reference to the accompanying drawing which is a perspective view of a seat according to the invention.

The seat comprises a frame section 5 and a seat section 6. The frame 5 is made of press shaped welded metal tubing to provide a generally horizontal frame 5a supported on the legs 5b and a pair of relatively short rear uprights 5c extending upwardly from the rear of the horizontal frame 5a. The seat 6 is a concave element of semirigid plastic material formed as an integral moulding and having integral upstanding wing-shaped side flanges 6a sloping downwardly as shown.

Formed integrally with the seat at the front edge of it are a pair of spaced engaging elements 6c in the form of longitudinally slotted tubular formations with their slots directed downwardly so as to be resiliently engageable over and around the front upper cross member 5d of the frame. Further, at each side and at the rear of the seat, along the rear ends of the side wings 6a, are similar slotted tubular means 6e adapted to engage the respective uprights 5c of the frame.

The procedure for assembling and disassembling the chair in this embodiment will be self-evident, and it will again be noted that the disassembling operation is simply effected by pulling the plastic element 6 upward and forward off the metal frame, in order to disengage the elements 6c from the front crosspiece of the frame and the elements 6e from the frame uprights.

The embodiment just described is especially advantageous in that the metal frame therein is especially small, lightweight, and inexpensive to construct, and the freely resilient backrest makes for special comfort. Further, a variety of attractive shapes can be imparted to the chair. Various other modifications will suggest themselves, including changes of a more or less ornamental character and such changes do not affect the invention as defined in the ensuing claims.

What I claim is:
1. A seat comprising a rigid frame made of frame members of generally round section, and comprising supporting legs, a generally horizontal seat frame section on said legs including a front cross member and a pair of relatively short uprights upstanding from said seat section near the rear side corners thereof; and a unitary molded element of resilient molded plastic capable of disassembly from said frame and including a seating portion and a back portion, engaging means integrally molded with the periphery of said element and defining longitudinally slotted tubular means of substantial resiliency including first engaging means adapted for clamping engagement with said front cross member and second engaging means adapted for engagement with the respective uprights whereupon said back portion of the element projects upwardly substantially beyond the top of said uprights, and said seat portion of the element is supported in a position to be sat on by a user.

2. A seat as in claim 1; wherein said element further has a pair of upstanding wing-like flanges formed at the sides of said seating portion of the element, and said second engaging means are formed at the rear of said respective flanges for engagement with said respective uprights.

References Cited in the file of this patent
UNITED STATES PATENTS

| | | |
|---|---|---|
| 2,706,518 | Fleischer | Apr. 19, 1955 |
| 2,764,228 | Donohue | Sept. 25, 1956 |
| 2,808,875 | Bargen | Oct. 8, 1957 |
| 2,990,007 | Kessler | June 27, 1961 |
| 3,061,374 | Grosfillex | Oct. 30, 1962 |